(12) United States Patent
Baizhiyenov et al.

(10) Patent No.: US 12,003,430 B2
(45) Date of Patent: Jun. 4, 2024

(54) SYSTEMS AND METHODS FOR CONTROL AND MANAGEMENT OF SHARED LOGICAL PORTS ON A NETWORK PROCESSOR

(71) Applicant: Arista Networks, Inc., Santa Clara, CA (US)

(72) Inventors: Ravil Baizhiyenov, Burnaby (CA); Adam Sweeney, San Jose, CA (US); John Nelson, San Jose, CA (US); Daniel Cunningham, San Jose, CA (US); Kewei Shi, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 29 days.

(21) Appl. No.: 17/493,345

(22) Filed: Oct. 4, 2021

(65) Prior Publication Data

US 2022/0109642 A1    Apr. 7, 2022

Related U.S. Application Data

(60) Provisional application No. 63/087,689, filed on Oct. 5, 2020.

(51) Int. Cl.
*H04L 12/931* (2013.01)
*H04L 49/45* (2022.01)

(52) U.S. Cl.
CPC .................. *H04L 49/45* (2013.01)

(58) Field of Classification Search
CPC ....................................................... H04L 49/45

USPC ........................................................ 370/329
See application file for complete search history.

(56) References Cited

U.S. PATENT DOCUMENTS

| | | | |
|---|---|---|---|
| 6,359,858 B1* | 3/2002 | Smith ............... | H04Q 11/0478 379/279 |
| 7,289,513 B1* | 10/2007 | Medved ................. | H04L 45/22 370/254 |
| 8,693,314 B1* | 4/2014 | Horton ...................... | H04L 1/22 370/219 |
| 2010/0202452 A1* | 8/2010 | Ram ....................... | H04L 12/18 370/390 |
| 2012/0230689 A1* | 9/2012 | Baldini .............. | H04Q 11/0067 398/48 |
| 2017/0149693 A1* | 5/2017 | Makiyama .............. | H04L 49/65 |
| 2023/0013489 A1* | 1/2023 | Phoenix ................ | H04L 63/168 |
| 2023/0015075 A1* | 1/2023 | Phoenix .............. | H04L 63/0236 |

OTHER PUBLICATIONS

R. Baizhly Handling Glacier Logical Ports Limitations, V.7, 2019/2020, 31 pages.

* cited by examiner

*Primary Examiner* — Robert J Lopata
(74) *Attorney, Agent, or Firm* — Sprinkle IP Law Group (57) ABSTRACT

In general, embodiments relate to a method for managing a network device. The method includes detecting a change of at least one physical port on the network device; and in response to detecting the change, disabling the at least one physical port, wherein disabling the at least one physical port prevents the at least one physical port from being allocated to any logical port on a network processor in the network device.

20 Claims, 6 Drawing Sheets

SYSTEMS AND METHODS FOR CONTROL AND MANAGEMENT OF SHARED LOGICAL PORTS ON A NETWORK PROCESSOR

CROSS REFERENCE TO RELATED APPLICATIONS

This application claims priority to U.S. Application No. 63/087,689, filed on Oct. 5, 2020, by Baizhiyenov et al., and titled "SYSTEMS AND METHODS FOR CONTROL AND MANAGEMENT OF SHARED LOGICAL PORTS ON A SWITCH CHIP," incorporated by reference in its entirety.

BACKGROUND

Network devices (e.g., switches, routers) typically include physical ports as a way of establishing physical connection with other network devices. For example, through the physical ports of a network device, the network device makes a physical connection to receive, process, and transmit traffic, with externally located devices. Network devices include functionality to receive data via the physical ports and then process the received packets (which is in the form of packets). The network devices process the received packets using, e.g., a network processor. In order to properly process the received packets, the network processor needs to allocate their internal resources (e.g., logical ports) to the physical ports. If there are changes to the physical ports on the network device (e.g., addition, removal or reconfiguration), the logical ports may need to be reallocated. Conventional approaches to reallocation result in packet loss and/or other performance degradation of the network device.

DETAILED DESCRIPTION

Network devices (e.g., switches and routers) typically include hardware (e.g., chassis) for facilitating mounting and housing of certain electronic circuit components, such as line cards. Line cards include functionality to receive data streams, provide the ingress data streams to the network processor, and transmit data streams received from the network processor. Data streams are assembled into packets by the network processor.

The line card interfaces with the network processor using physical ports. More specifically, the line cards include transceiver slots, where each of the transceiver slots includes one or more physical ports. Further, the transceiver slots may support different types of configurations of the physical ports. For example, a transceiver slot may include four physical ports and support an aggregate data rate of 100 Gbps; however, it may be configured to support four data streams of 25 Gbps each, two data streams of 50 Gbps each or one data stream of 100 Gbps. The disclosure is not limited to this example.

Network devices may be designed to support different types of transceivers and/or transceivers with different types of configurations. This allows users to optimize the network devices for their specific use cases. However, when users change transceivers and/or their configurations, this triggers a reallocation of the mapping of the physical ports on the transceivers to the logical ports in the network processor within the network device. The reallocation may be performed using any known or later discovered allocation mechanism. Regardless of the allocation mechanism used, this reallocation (or update in mappings between physical ports and logical ports) may result in some physical ports no longer being mapped to a logical port. If a physical port is no longer mapped to a logical port, data received on such a physical port is not processed and data may not be transmitted from the network processor (via a logical port) to an unmapped physical port.

To prevent the aforementioned issue, embodiments of the disclosure detect a change (e.g., addition, deletion, change in data rate) in a physical port on the network device. In response to the detection, any newly detected physical ports (which may be newly added physical ports and/or existing physical ports with an updated data rate) are disabled. Once a physical port is disabled, the physical port is an unallocatable port. Said another way, when a physical port is disabled, the allocation mechanism does not attempt to allocate the physical port to a logical port. As a result, when a new physical port is detected by the network device, it does not automatically attempt to allocate the physical port to a logical port. Rather, the new physical port is not allocated until a user of the network device (e.g., an administrator) enables the physical port. Once the new physical port is enabled, the new physical port is allocatable and, as such, the network device attempts to allocate (or map) the new physical port to a logical port. Using various embodiments of the disclosure, users are able to facilitate a more graceful update of the allocations in the network device by selectively enabling the new physical ports that are automatically disabled (or set as unallocatable) when they are initially detected by the network device.

Various embodiments of the disclosure are described below.

Figure 1:
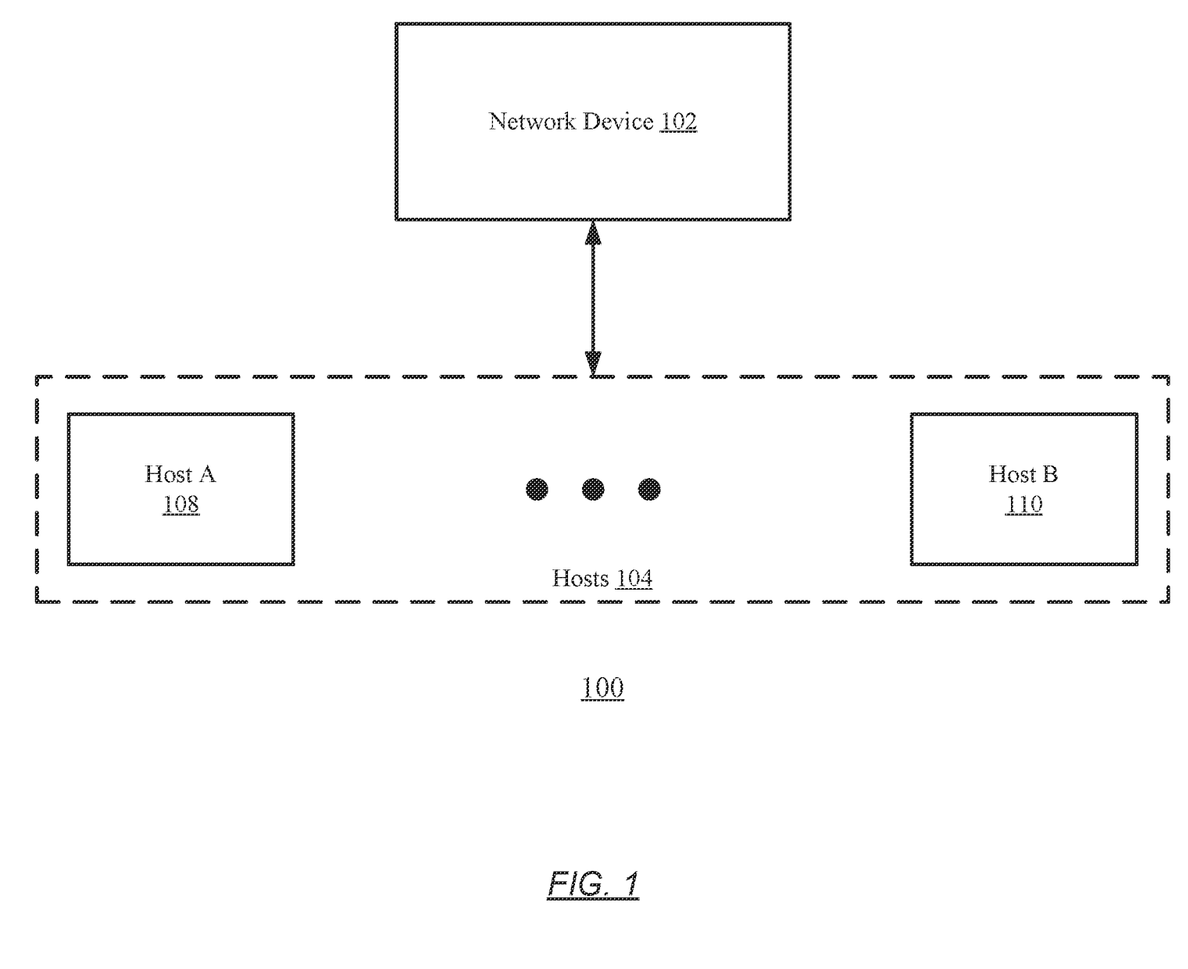
FIG. 1 shows a diagram of a system in accordance with one or more embodiments of the disclosure.

FIG. 1 shows an example system in accordance with one or more embodiments of the disclosure. The system (100) includes a network device (102) directly coupled to one or more hosts (104), e.g., Host A (108), Host B (110). Though not shown in FIG. 1, each host (104) may be connected to a network device using one or more cables (e.g., optical cables, Ethernet Cables). Further, though not shown in FIG. 1, the system may include multiple network devices, where each of the network devices may be directly connected to one or more hosts (104). Further, a given host (104) may include multiple direct connections to a given network device (e.g., 102). Additional detail about the direct connections between hosts and network devices are provided in FIG. 3.

In one or more embodiments, the hosts (104) include functionality to send packets to and receive packets from network devices (e.g., 102). Further details of the hosts (104) are provided in FIG. 6.

In one or more embodiments of the disclosure, the network device (102) is a physical device that may be used for performing various embodiments of the disclosure. The physical device may correspond to any physical system with functionality to implement one or more embodiments of the disclosure. For example, the physical device may be a switch or a router that is directly connected to at least one host (e.g., 108, 110). The network device (102) may include persistent storage, memory (e.g., random access memory), one or more processors, one or more network processors, and two or more physical ports.

In one or more embodiments of the disclosure, the network device (102) includes executable instructions (stored in a non-transitory computer readable medium, e.g., in persistent storage), which when executed, enable the network device (102) to perform one or more methods described below (see e.g., FIGS. 4, 5). Additional detail about the network device is described below with respect to FIGS. 2 and 3.

Examples of a network device include, but are not limited to, a router, a switch, and a multilayer switch. The network device is not limited to the aforementioned specific examples. Further details of a network device are provided in FIGS. 2, 3.

While FIG. 1 shows a particular system architecture, the disclosure is not limited to the system architecture shown in FIG. 1. For example, while FIG. 1 shows one network device and one network, implementations of the disclosure may include one or more of each of the aforementioned elements without departing from the disclosure.

Figure 2:
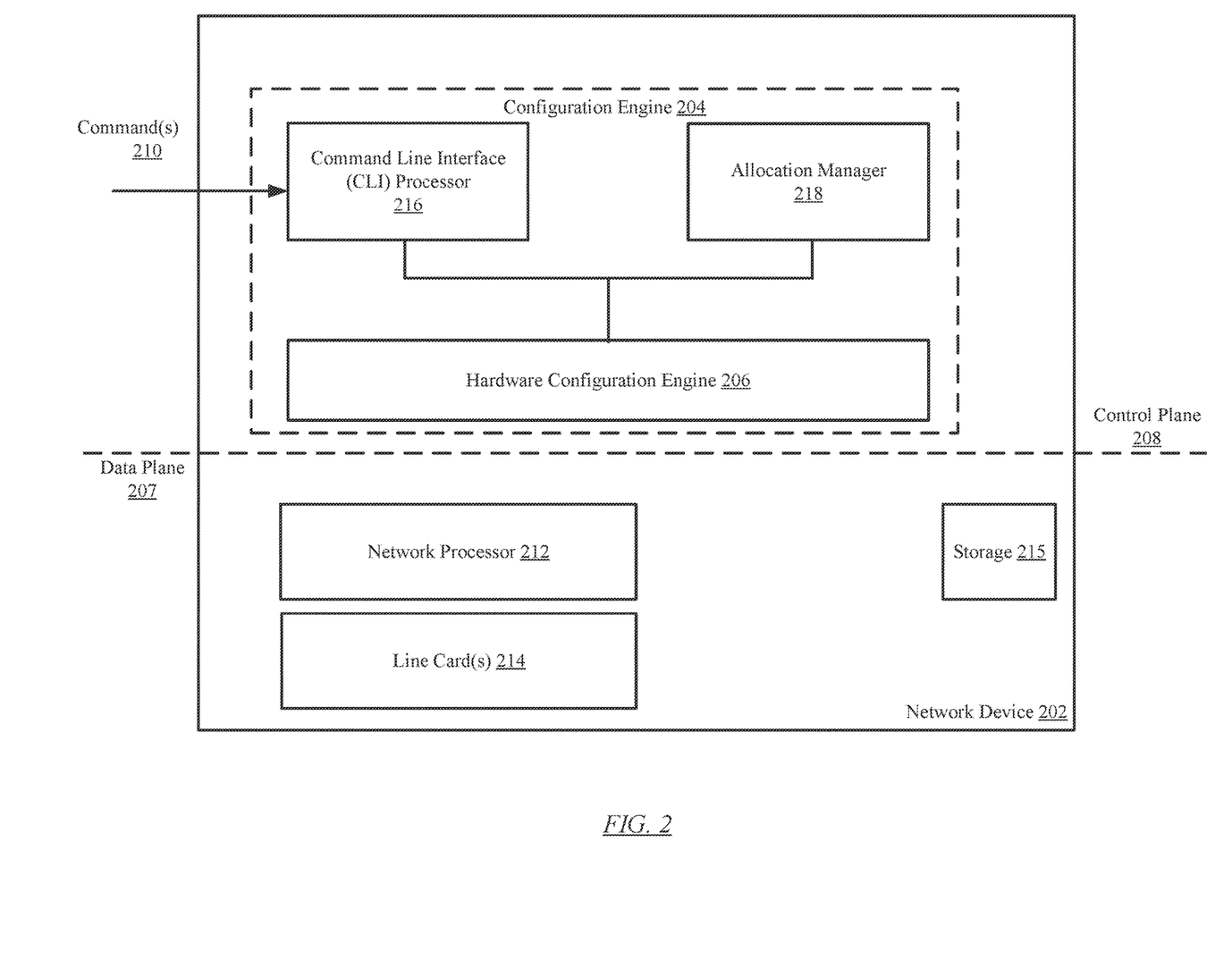
FIGS. 2-3 show diagrams of a network device in accordance with one or more embodiments of the disclosure.

FIG. 2 shows a diagram of a network device in accordance with one or more embodiments of the disclosure. The network device (202) includes a configuration engine (204), a network processor (212), storage (215), and one or more line cards(s) (214).

In one or more embodiments, the network processor (212) includes logical ports. In one or more embodiments, the network processor (212), in the data plane (207) of the network device (202), includes functionality to receive packets (also referred to as ingress packets) from the line cards (214) via the logical ports and process the ingress packets (which may include dropping the packet, forward the packet towards its destination, providing the packet (or its payload) to the control plane (208), etc.).

In one or more embodiments, the line card(s) (214) is a hardware component that is electrically coupled to the network device (202) and includes one or more transceivers (not shown). The transceivers may be mounted (or otherwise connected) to the line card via one or more transceiver slots (not shown). The transceiver slots (not shown) include one or more physical ports, where data received at the physical ports is transmitted to the network processor (212) (via the mapped logical ports) for processing. Further details of the network processor (212), line cards (214), physical ports, and logical ports are provided below in FIG. 3.

In one or more embodiments, the configuration engine (204) includes a command line interface (CLI) processor (216), an allocation manager (218), and a hardware configuration engine (206). The CLI processor (216) receives commands (e.g., CLI commands) (210) which may specify a hardware description (e.g., a physical port identifier(s)) from a user (e.g., an administrator) and the allocation manager (218) reacts to the user-provided command Example of commands may include, but are not limited to: (i) an auto-disable command, which instructs the allocation manager (or another component in the configuration engine) to automatically disable newly discovered physical ports (see e.g., FIG. 4); (ii) an enable command, which instructs the allocation manager to enable a previously disabled physical port (see e.g., FIG. 5); and (iii) a disable command to disable one or more enabled physical ports.

In one or more embodiments, the CLI processor (216) may further publish a state of logical ports from the storage (215), for example, the status of logical ports allocation for the available pools. The CLI processor (216) consumes the published state and validates a command received from a user. For example, the CLI processor (216) may validate a command through guards, errors and warning messages. The allocation manager (218) reacts to the change in physical port configuration and allocates the logical ports to the allocatable physical ports.

In one or more embodiments, the allocation manager (218) includes functionality to: (i) set the state of a given physical port to disabled or enabled (in response to an appropriate command (210) from the user) and (ii) perform allocation (or re-allocation) of the logical ports (see e.g., FIG. 5). With respect to the allocation (or re-allocation) of the logical ports, the allocation manager is configured to not to allocate (or otherwise consider) any disabled physical ports as part of any allocation (or re-allocation).

In one or more embodiments, the hardware configuration engine (206) programs the configuration of the network processor (and any other hardware in the network devices that is required to be programmed).

In one or more embodiments of the disclosure, the CLI processor (216) is a physical or virtual device that may be used for performing various embodiments of the disclosure. The physical device may correspond to any physical system with functionality to implement one or more embodiments of the disclosure. In another embodiment, the CLI processor (216) is a physical device that includes persistent storage, memory (e.g., random access memory), one or more processor(s).

In one or more embodiments of the disclosure, the network device includes executable instructions (stored in a non-transitory computer readable medium (not shown)), which when executed by a processor (not shown) in the network device, enable the network device to the functionality of the CLI processor (216) described throughout this application.

In one or more embodiments of the disclosure, the allocation manager (218) is a physical or virtual device that may be used for performing various embodiments of the disclosure. The physical device may correspond to any physical system with functionality to implement one or more embodiments of the disclosure. In another embodiment, the allocation manager (218) is a physical device that includes persistent storage, memory (e.g., random access memory), one or more processor(s).

In one or more embodiments of the disclosure, the network device includes executable instructions (stored in a non-transitory computer readable medium (not shown)), which when executed by a processor (not shown) in the network device, enable the network device to the functionality of the allocation manager (218) described throughout this application.

In one or more embodiments of the disclosure, the hardware configuration engine (206) is a physical or virtual device that may be used for performing various embodiments of the disclosure. The physical device may correspond to any physical system with functionality to implement one or more embodiments of the disclosure. In another embodiment, the hardware configuration engine (206) is a physical device that includes persistent storage, memory (e.g., random access memory), one or more processor(s).

In one or more embodiments of the disclosure, the network device includes executable instructions (stored in a non-transitory computer readable medium (not shown)), which when executed by a processor (not shown) in the network device, enable the network device to the functionality of the hardware configuration engine (206) described throughout this application.

One skilled in the art will recognize that the architecture of the network device is not limited to the components shown in FIG. 2. For example, the network devices may each include components not shown in FIG. 2 or include alternate or fewer components as those shown in FIG. 2.

Figure 3:
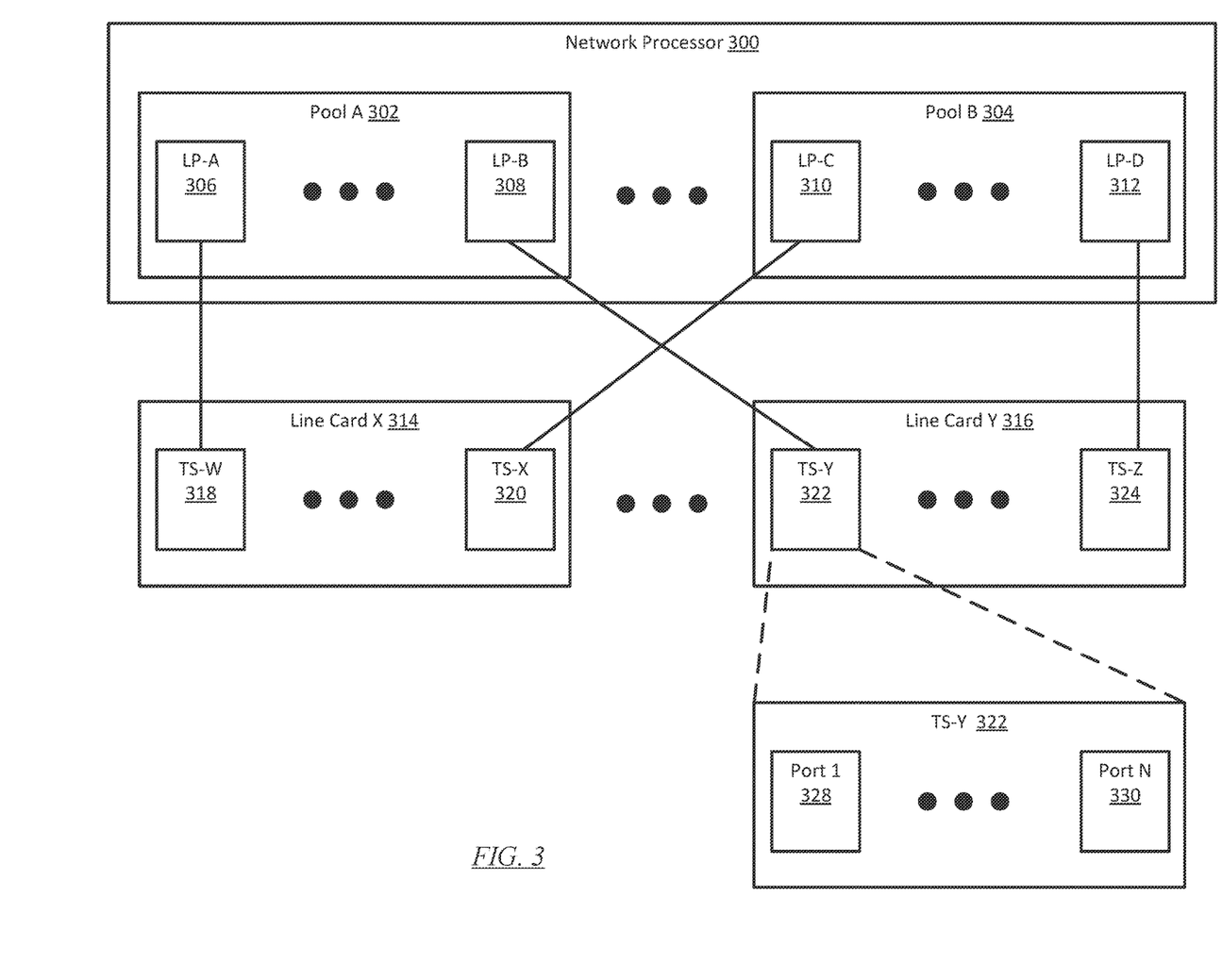

FIG. 3 shows additional details about the relationship between physical ports and logical ports in accordance with one or more embodiments. More specifically, the network processor (300) includes one or more logical ports (e.g., LP-A (306), LP-B (308), LP-C (310), LP-D (312)). The logical ports may be grouped into pools (e.g., Pool A (302), Pool B (304)); however, the network processor (300) is not required to support the grouping of logical ports into pools.

The network device (not shown) may include one or more line cards (e.g., Line Card X (314), Line Card Y (316)). Each of the line cards (Line Card X (314), Line Card Y (316)) includes one or more transceiver slots (TS-W (318), TS-X (320), TS-Y (322), TS-Z (324)). Each transceiver slot (e.g., TS-W (318), TS-X (320), TS-Y (322), TS-Z (324)) is configured to hold one or more transceivers (not shown). The transceivers may be an optical transceiver, a copper transceiver or any other type of transceiver. The transceivers are configured to receive data streams (e.g., optical or electrical data streams depending on the type of transceiver). The data streams are ultimately transmitted to the physical ports. Each transceiver slot (e.g., 322) may include one or more physical ports (e.g., Port 1 (328), Port N (330)). The physical ports are physical interfaces that enable the transmission of data from the line cards to the network processor.

In one or more embodiments, each physical port is mapped to zero or one logical port. A given physical port (which is enabled) may not be mapped (or otherwise allocated) to a logical port when there are more enabled physical ports than logical ports in the network device. For example, if there are 32 enabled physical ports and 24 logical ports, then eight of the enabled physical ports are not allocated to a logical port. Continuing with the discussion of FIG. 3, if a given enabled physical port is not mapped to a logical port, the data received at the physical port are dropped or otherwise not processed by the network processor as the network processor is only configured to process packets that it receives via its logical ports.

Continuing with the discussion of FIG. 3, in one or more embodiments, the transceiver slot may be configurable. In these scenarios, physical ports within a given transceiver slot may be logically combined to transmit the same data stream. For example, consider a scenario in which a transceiver slot includes four physical ports and supports an aggregate data rate of 100 Gbps. In one configuration, each of the four physical ports transmits its own separate data stream at a data rate of 25 Gbps. In a second configuration, the transceiver slot may be configured to support two 50 Gbps data streams; in this configuration, each data stream may be transmitted towards the network processor by the transceiver slot via one or two physical ports. Finally, in a third configuration, the transceiver slot may be configured to support one 100 Gbps data stream; in this configuration the data stream may be transmitted towards the network processor via one or more physical ports. Regardless of the configuration, each data stream is allocated to one logical port. Accordingly, in the first configuration four logical ports are required, in the second configuration two logical ports are required, and in the third configuration one logical port is required. The configuration of the transceiver slots may be initiated by the user via one or more commands. Once such commands are processed, the hardware configuration engine includes functionality to implement the configuration change in the transceiver slots.

Figure 4:
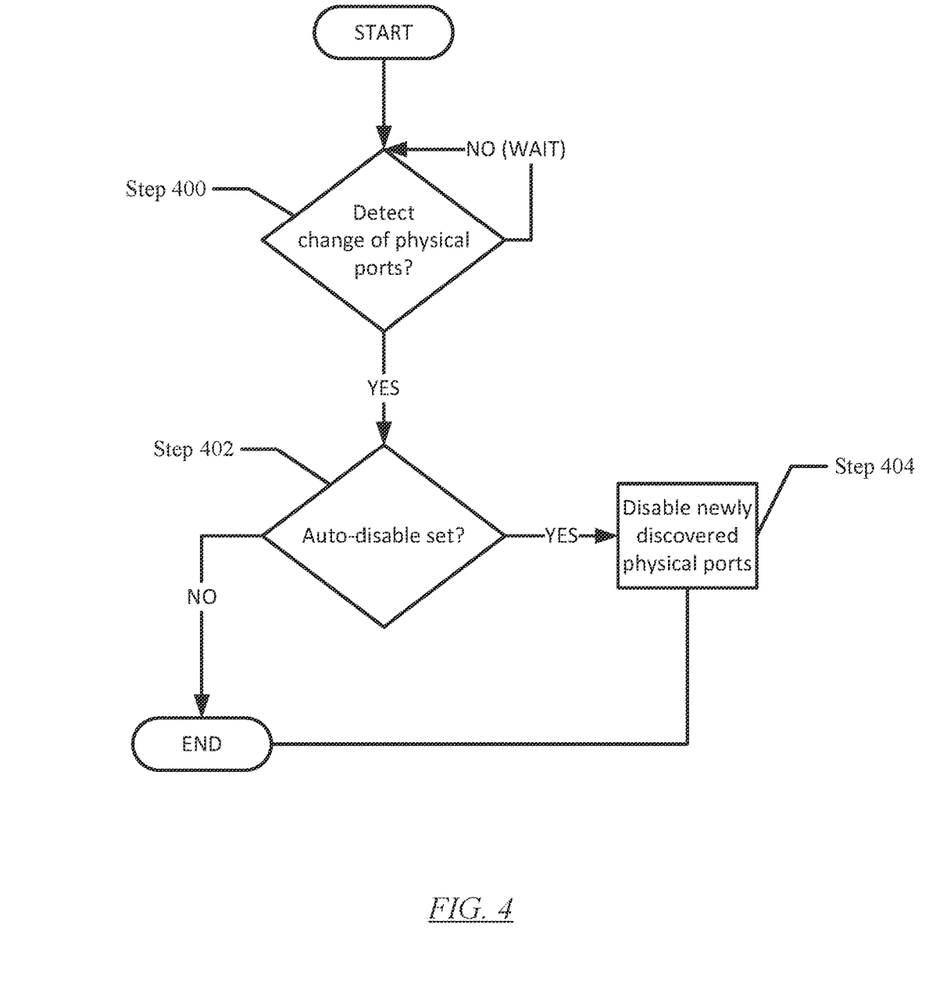
FIG. 4 shows flowchart for detecting a change in physical ports on the network device in accordance with one or more embodiments of the disclosure.

FIG. 4 shows flowchart for detecting a change in physical ports in accordance with one or more embodiments of the disclosure. In some embodiments of the disclosure, the method of FIG. 4 may be performed by the configuration engine (e.g., FIG. 2, 204). However, the method shown in FIG. 4 may be performed by other components in the network device without departing from disclosure.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 400, a change in the physical ports on the network device is detected. In one or more embodiments, the change in the physical ports may be the addition of one or more new physical ports (i.e., a physical port that needs to the allocated) as the result of: (i) insertion of a line card into the network device; (ii) insertion of a transceiver (which may or may not be to replace an existing transceiver) into a transceiver slot on a line card in the network device; or (iii) a change in a data rate of a physical port(s). If a change has been detected, the process proceeds to step 402; otherwise, the configuration engine continues to monitor for changes to the physical ports.

In step 402, when a change is detected, a determination is made about whether auto-disable has been set. In one or more embodiments, a user via a command issued to the CLI may set the configuration engine to automatically disable any newly detected physical port. If auto-disable has been set, then the process proceeds to step 404; otherwise, the process ends. In this context, the process ending results in the configuration engine taking no action with respect to disabling the newly detected physical ports.

In step 404, when auto-disable is set, then the configuration engine disables the newly discovered physical port(s) (i.e., makes the physical port(s) unallocatable). As discussed above, the state of the physical ports (e.g., whether the physical port is enabled or disabled) is stored in the network device and is accessible to the configuration engine for subsequent use (see e.g., FIG. 5).

The process shown in FIG. 4 may be performed continuously on the network device in order to detect changes to the physical ports and then to take appropriate action (or no action in scenarios in which auto-disable is not set).

Figure 5:
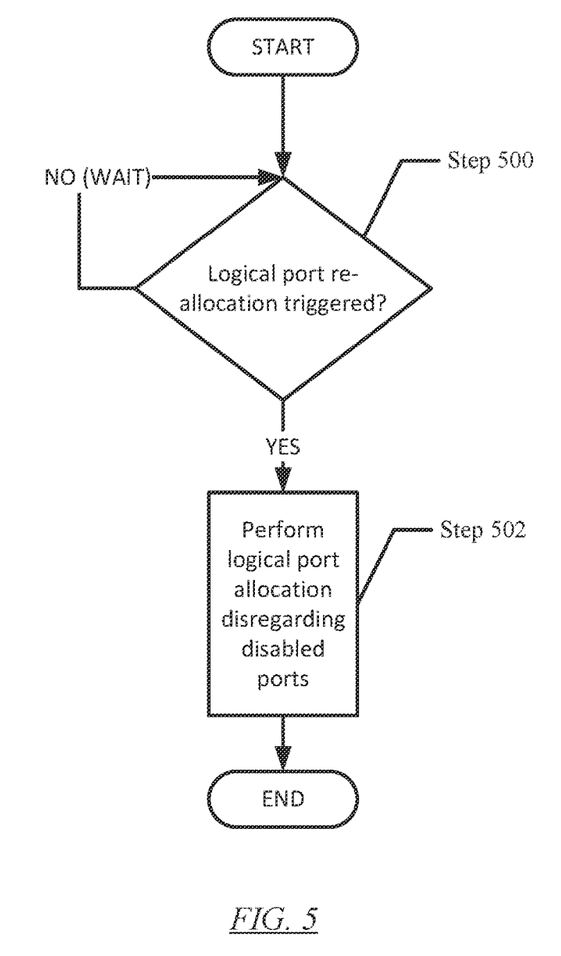
FIG. 5 shows a flowchart for re-allocating logical ports in accordance with one or more embodiments of the disclosure.

FIG. 5 shows flowchart for re-allocating logical ports in accordance with one or more embodiments of the disclosure. In some embodiments of the disclosure, the method of FIG. 5 may be performed by the configuration engine (e.g., FIG. 2, 204). However, the method shown in FIG. 5 may be performed by other components in the network device without departing from disclosure.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 500, a determination is made about whether logical port re-allocation is triggered. In one or more embodiments, logical port re-allocation may be triggered when there is a change to the physical ports allocated to a given pool. The following are three non-limiting examples of scenarios which may trigger re-allocation. In a first example, consider a scenario in which physical ports 1-4 are allocated to Pool A, where physical ports 1-2 are located on transceiver slot X. If transceiver slot X is replaced with transceiver slot Y (e.g., when a line card that includes transceiver slot X is replaced with a line card that includes transceiver slot Y), then a change will be detected that physical ports 1-2 are no longer present as transceiver slot X has been removed. This may trigger logical port re-allocation. In another example, consider a scenario in which physical ports 1-4 are allocated to Pool A, where physical ports 1-4 are located on transceiver slot Z and are each configured to support their own 25 Gbps data stream. Based on this configuration of transceiver slot Z, each of the four physical ports are allocated to their own logical port in Pool A. At some later point in time, the configuration of transceiver slot Z is changed to support a single data stream of 100 Gbps; thus, only one logical port is required (instead of four). This may trigger a logical port re-allocation.

In another example, consider a scenario in which a newly discovered physical port is initially disabled (see FIG. 4). At a later point in time, the user issues a command to enable the previously disabled physical port. The enabling of the physical port triggers a logical port re-allocation.

Logical port re-allocation may be triggered for other reasons without departing from the disclosure.

If logical port re-allocation is triggered, the process proceeds to step 502; otherwise, the configuration engine continues to monitor the network device for events that may trigger logical port re-allocation.

In step 502, the configuration engine performs allocation (or re-allocation) of the logical ports to the allocatable physical ports (i.e., the physical ports that are not disabled). The allocation (or re-allocation) may be performed using any known or later discovered allocation mechanism. The allocation (or re-allocation) may result in at least one physical port being mapped to a different logical port on the network processor.

Once the allocation (or re-allocation) is completed, the hardware configuration engine may initiate the update of the configuration of the network processor based on the new allocation (re-allocation).

By limiting the allocation (or re-allocation) to only allocatable physical ports, various embodiments prevent the automatic reallocation of all newly added physical ports; rather, users may ensure a more graceful re-allocation (i.e., a re-allocation with less disruption to the operation of the network device) by selectively enabling (via commands issued to the CLI processor) one or more of the new added physical ports.

Figure 6:
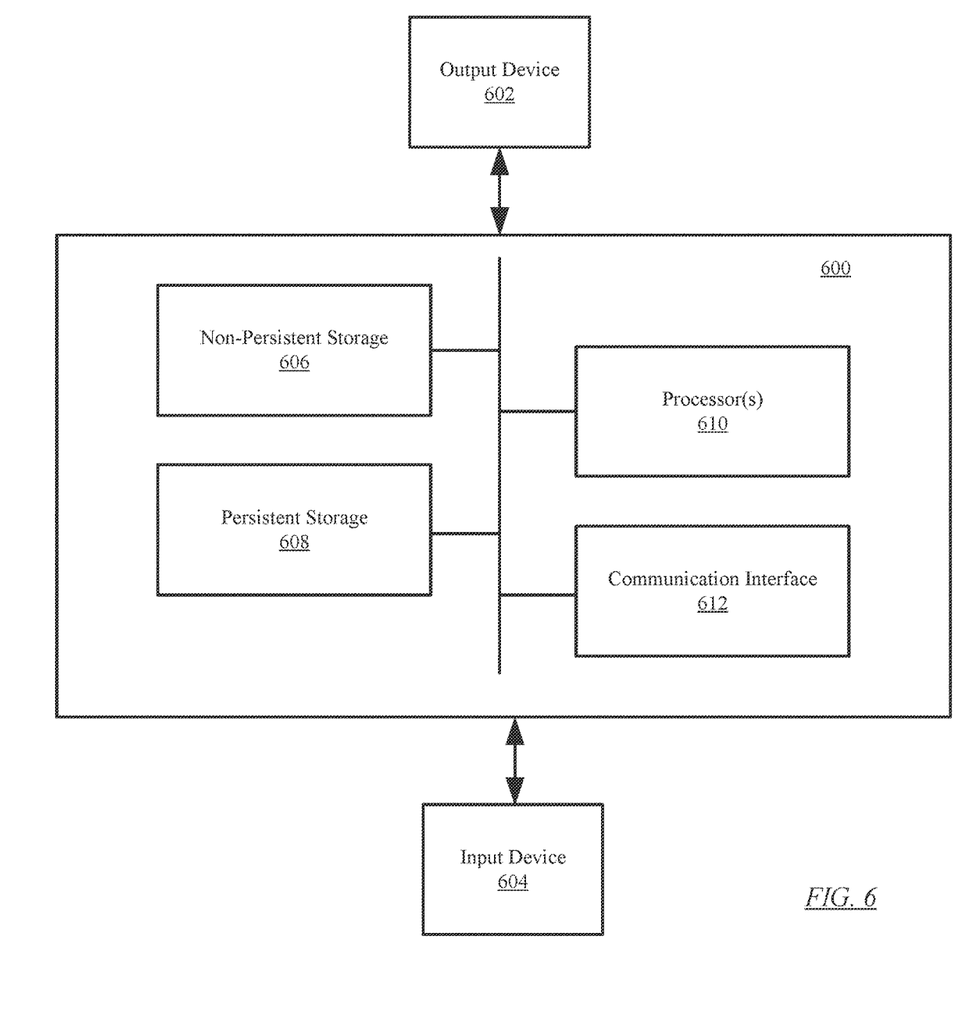
FIG. 6 shows a computing device in accordance with one or more embodiments of the disclosure.

As discussed above, embodiments of the disclosure may be implemented using computing devices. FIG. 6 shows a diagram of a computing device in accordance with one or more embodiments of the disclosure. The computing device (600) may implement an embodiment of a host (e.g., 108, 110, in FIG. 1). The computing device (600) may include one or more computer processors (610), non-persistent storage (606) (e.g., volatile memory, such as random access memory (RAM), cache memory), persistent storage (608) (e.g., a hard disk, an optical drive such as a compact disk (CD) drive or digital versatile disk (DVD) drive, a flash memory, etc.), a communication interface (612) (e.g., Bluetooth® interface, infrared interface, network interface, optical interface, etc.), input devices (604), output devices (602), and numerous other elements (not shown) and functionalities. Each of the components illustrated in FIG. 6 is described below.

In one or more embodiments of the disclosure, the computer processor(s) (610) may be an integrated circuit for processing instructions. For example, the computer processor(s) may be one or more cores or micro-cores of a processor. The computing device (600) may also include one or more input devices (604), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one or more embodiments of the disclosure, the computing device (600) may include one or more output devices (602), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (610), non-persistent storage (606), and persistent storage (608). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network device, comprising:
   operating the network device having a plurality of physical ports, wherein the plurality of physical ports are allocated to one or more of a plurality of logical ports according to a first allocation;
   detecting that a new physical port has been added to the network device;
   in response to detecting that the new physical port has been added to the network device, disabling the new physical port;
   preventing allocation of any disabled physical ports;
   keeping the new physical port in a disabled state until an indication from a user to enable the new physical port is received;
   in response to receiving the indication from the user, enabling the new physical port and allocating the enabled new physical port to the one or more of the plurality of logical ports.

2. The method of claim 1, wherein detecting that a new physical port has been added to the network device comprises detecting that a transceiver slot comprising the new physical port has been added to the network device.

3. The method of claim 2, wherein detecting that a new physical port has been added to the network device comprises detecting that a physical port which is one of a second plurality of physical ports has been added to the network device, the second plurality of physical ports comprising the transceiver slot.

4. The method of claim 1, further comprising:
   determining that logical port re-allocation is required for at least a portion of the plurality of logical ports; and
   in response to the determination, re-allocating at least one of the plurality of logical ports to a different one of at least one of the plurality of physical ports on the network device, wherein the re-allocating includes the new physical port if the new physical port is not disabled during the re-allocating.

5. The method of claim 1, further comprising:
   enabling, after the disabling, the new physical port;
   after the enabling:
      determining that logical port re-allocation is required for at least a portion of the plurality of logical ports; and
      in response to the determination, re-allocating at least one of the plurality of logical ports to a different one of at least one of the plurality of physical ports on the network device, wherein the re-allocating includes the new physical port.

6. The method of claim 1, further comprising:
   prior to the detecting:
      receiving a user command to automatically disable any newly detected physical ports on the network device.

7. A method for managing a network device, comprising:
   operating the network device having a plurality of physical ports, wherein the plurality of physical ports are allocated to one or more of a plurality of logical ports according to a first allocation;
   detecting a change of at least one physical port on the network device; and
   in response to detecting the change, disabling the at least one physical port, preventing allocation of any disabled physical ports;
   keeping the at least one physical port in a disabled state until an indication from a user to enable the at least one physical port is received;
   in response to receiving the indication from the user, enabling the at least one physical port and allocating the enabled at least one physical port to the one or more of the plurality of logical ports.

8. The method of claim 7, wherein detecting that the at least one physical port has been added to the network device comprises detecting that the at least one physical port on a line card has been added, the line card comprising the network device.

9. The method of claim 8, wherein detecting the change comprises detecting an insertion of the line card on the network device.

10. The method of claim 8, wherein detecting the change comprises detecting an insertion of a transceiver into a transceiver slot on the line card, wherein the at least one physical port is located in the transceiver slot.

11. The method of claim 10, wherein the transceiver replaces a second transceiver that was previously inserted in the transceiver slot.

12. The method of claim 8, wherein detecting the change comprises detecting a change in a data rate of the at least one physical port.

13. The method of claim 12, wherein detecting the change in a data rate of the at least one physical port comprises detecting an increase in a data rate.

14. The method of claim 7, further comprising:
   determining that logical port re-allocation is required for at least a portion of the plurality of logical ports; and
   in response to the determination, re-allocating at least one of the plurality of logical ports to a different one of the plurality of physical ports on the network device, wherein the re-allocating includes the at least one physical port if the at least one physical port is not disabled during the re-allocating.

15. The method of claim 14, further comprising:
   enabling, after the disabling, the at least one physical port.

16. The method of claim 7, further comprising:
   prior to the detecting:
      receiving a user command to automatically disable any newly detected physical ports on the network device.

17. A network device, comprising:
   a first transceiver slot comprising a first plurality of ports,
   a network processor comprises a plurality of logical ports;
   a processor;
   a configuration engine configured to perform a method when executed on the processor, the method comprising:

operating according to a first allocation of the plurality of physical ports to one or more of the plurality of logical ports, detecting insertion of a second transceiver slot, wherein the second transceiver slot comprises a second plurality of physical ports, and in response to detecting the insertion, disabling the second plurality of physical ports, preventing allocation of any disabled physical ports, keeping the new physical port in a disabled state until an indication from a user to enable the new physical port is received, and in response to receiving the indication from the user, enabling the new physical port and allocating the enabled new physical port to the one or more of the plurality of logical ports.

18. The network device of claim 17, wherein all of the first plurality of physical ports that are not disabled are allocated to one of the plurality of logical ports.

19. The network device of claim 17, wherein the method further comprises:

prior to the detecting:
receiving a user command to automatically disable any newly detected physical ports on the network device.

20. The network device of claim 17, wherein the first transceiver slot is located on a first line card and second transceiver slot is located on a second line card.

* * * * *